United States Patent [19]

Foreman

[11] Patent Number: 5,595,019

[45] Date of Patent: Jan. 21, 1997

[54] PLANT SUPPORT

[76] Inventor: Howard R. Foreman, 63366 E. 111 Rd., Miami, Okla. 74354

[21] Appl. No.: 539,974

[22] Filed: Oct. 6, 1995

[51] Int. Cl.[6] .......................... A01G 17/06; A01G 17/14
[52] U.S. Cl. ...................................... 47/47; 47/45
[58] Field of Search .................. 47/47 R, 47 S, 47/47 L, 45 R, 45 C; 248/156; 211/166

[56] References Cited

U.S. PATENT DOCUMENTS

| | | | |
|---|---|---|---|
| 1,556,373 | 10/1925 | Thoeni . | |
| 1,587,740 | 6/1926 | Wiswell . | |
| 2,009,668 | 7/1935 | Lay | 47/47 S |
| 2,484,449 | 10/1949 | Fetterman | 47/47 S |
| 2,764,846 | 10/1956 | Worthington | 47/47 L |
| 2,851,823 | 9/1958 | Peterson | 47/47 S |
| 3,041,783 | 7/1962 | Pezdek et al. | 47/45 C |
| 3,194,403 | 7/1965 | Van Horn, Jr. | 211/166 |
| 3,731,429 | 5/1973 | Orthman . | |
| 4,213,272 | 7/1980 | Nievelt | 47/45 C |
| 4,519,162 | 5/1985 | Stuckey . | |
| 4,534,129 | 8/1985 | Stuckey . | |
| 4,703,584 | 11/1987 | Chazalnoel . | |
| 5,341,593 | 8/1994 | Foreman . | |
| 5,440,834 | 8/1995 | Kleinert | 47/47 |

FOREIGN PATENT DOCUMENTS 344255  3/1960  Switzerland ................. 47/47

Primary Examiner—Terry Lee Melius
Assistant Examiner—Joanne C. Downs
Attorney, Agent, or Firm—Frank J. Catalano; Scott R. Zingerman

[57] ABSTRACT

A support for a plant has a rod with at least two spaced apart brackets, the uppermost bracket being proximate the upper end of the rod. One or more cages has means thereon adapted to cooperate with the brackets to connect the cage substantially concentrically about the rod. The depth of the uppermost cage from its top to its connecting means is greater than the distance from the uppermost bracket to the upper end of the rod, so that the top of the uppermost portion of the cage extends significantly above the top of the rod.

Preferably, each of the cages has a plurality of substantially horizontal loops fixed in spaced-apart relationship by a plurality of substantially vertical legs. The loops of each cage are substantially circular and each sequentially higher loop preferably has a diameter greater than an immediately preceding loop of the cage. Furthermore, a lowermost loop of each cage has a diameter greater than an uppermost loop of an immediately preceding cage so that the cages are easily nested in each other.

15 Claims, 3 Drawing Sheets

PLANT SUPPORT

BACKGROUND OF THE INVENTION

This invention relates generally to gardening accessories and more particularly concerns supports for long stemmed plants such as tomato plants and the like.

Most known plant supports, such as those described by Stuckey in U.S. Pat. Nos. 4,519,162 and 4,534,129, Orthman in U.S. Pat. No. 3,731,429 and Wiswell in U.S. Pat No. 1,587,740, use rings supported on only one side by a stake. To counter the leverage applied at the unsupported side of the ring by the plant stem and branches, heavy, clumsy and expensive stakes and rings are required. A more balanced center stake plant support is described by Thoeni in U.S. Pat. No. 1,556,373, but this device also requires heavy, clumsy and expensive stakes, rings and hubs.

These problems and others were solved by my improved center stake plant support described in U.S. Pat. No. 5,341,593. However, the attachment of the plant support ring to the main stake is still somewhat complicated and must be repeated for each level of plant supporting ring employed. Furthermore, while the cost and ease of operation of my improved support were better than for previously known devices, the number of separate components required in a multi-ring arrangement and the length of the center stake required to support the full grown height of the plant leave room for further improvement.

It is, therefore, an object of this invention to provide an inexpensive center stake plant support. Another object of this invention is to provide a center stake plant support which is easy to assemble. A further object of this invention is to provide a center stake plant support having a simple mechanism for connection of plant support rings to the center stake. Yet another object of this invention is to provide a center stake plant support to which multiple ring assemblies can be readily added as the height of the plant increases. And it is an object of this invention to provide a center stake plant support to which multiple rings can be secured by a single connecting means.

SUMMARY OF THE INVENTION

In accordance with the invention, a support for a plant has a rod with at least two brackets fixed in spaced apart relationship thereon. The uppermost bracket is proximate the upper end of the rod. At least one cage has means thereon cooperable with one of the rod brackets to connect the cage to the rod. The cage depth from its top to the connecting means is greater than the distance from the uppermost bracket to the upper end of the rod, so that the top of the uppermost edge extends significantly above the top of the rod.

Preferably, each rod bracket has a first loop of wire fixed at one portion to the rod and extending at an opposite portion away from the rod to define a space therebetween and a second loop of wire substantially similar to the first loop but slidably disposed on the rod above the first loop. Also, preferably, the connecting means is a member of cross-section contoured to fit snugly into the spaces defined by the rod and the loops with at least one arm extending from its mid-portion to the cage. When a lower portion of the member is inserted into the space and one arm rests on the fixed loop, the sliding loop may be lowered around the rod and an upper portion of the member until the sliding loop rests on the arm. This locks the cage in place on the rod. Preferably, the rod is of circular cross-section and the cages have a plurality of substantially horizontal loops fixed in spaced-apart relationship by a plurality of substantially vertical legs.

A tapered anchor may be used at the lower end of the rod for easy penetration into the earth. A cap may be provided at the upper end of the rod with a perimeter large enough to prevent passage of the sliding loop thereover. Preferably, the loops of each cage are substantially circular and each sequentially higher loop has a diameter greater than an immediately preceding loop of the cage. Furthermore, a lowermost loop of each cage has a diameter greater than an uppermost loop of an immediately preceding cage so that the cages are easily nested in each other. The cages are preferably substantially concentrically disposed about the rod. In a particularly preferred embodiment, the connecting means has a semi-circular segment of a tube tapered from a mid-portion thereof to approximately quarter circular upper and lower ends and a plurality of arms extending substantially radially from an outer wall of the mid-portion to a not-uppermost loop of the cage. The sliding loop may have an integral handle extending approximately radially therefrom for easy manipulation of the loop and the fixed loop may have integral legs extending upwardly and downwardly at ends thereof for easy connection to the rod.

BRIEF DESCRIPTION OF THE DRAWINGS

Other objects and advantages of the invention will become apparent upon reading the following detailed description and upon reference to the drawings in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
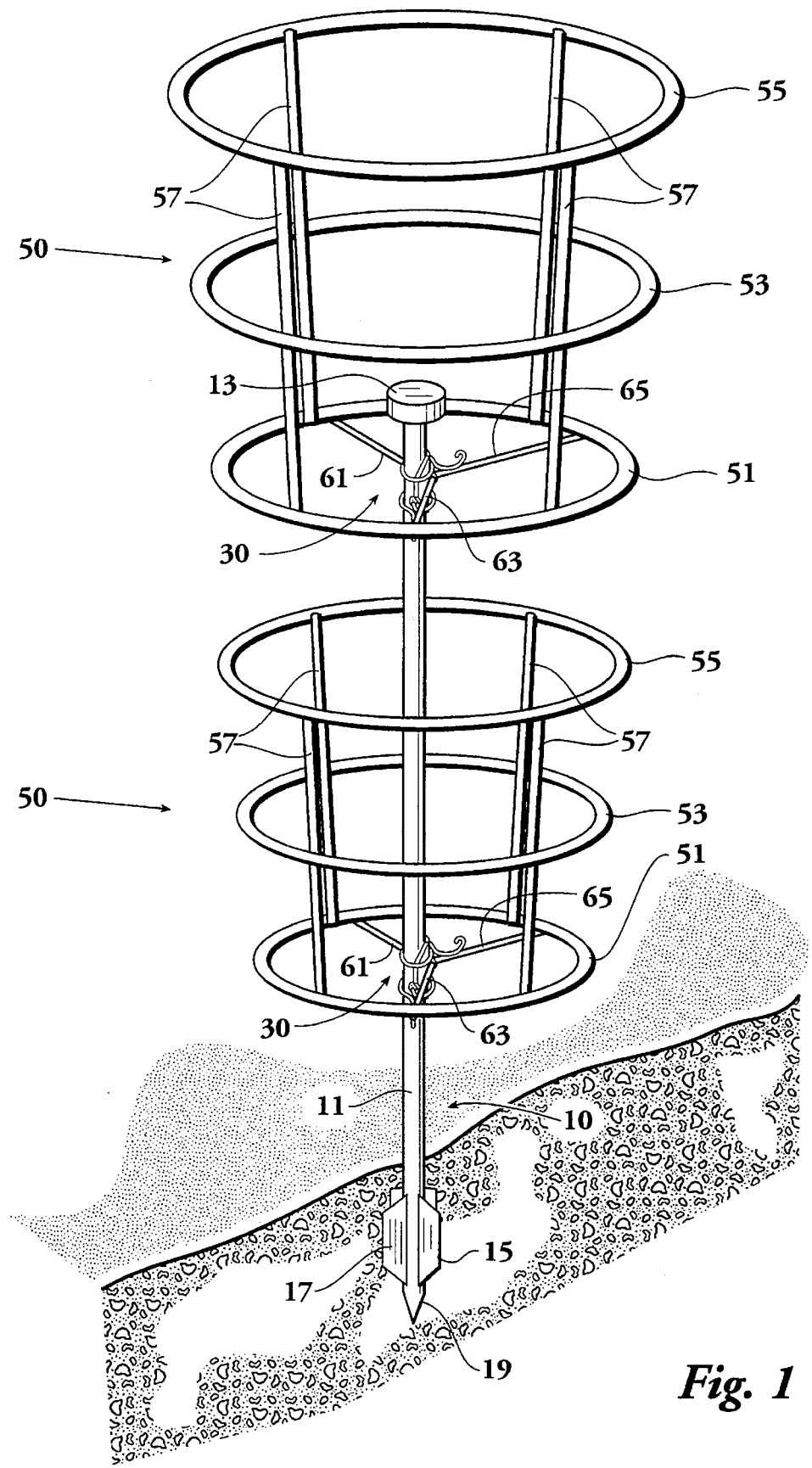
FIG. 1 is a perspective view of a preferred embodiment of the plant support.

A preferred embodiment of the plant support is illustrated in FIG. 1. The plant support consists essentially of a stake 10, one or more mounting brackets 30 spaced apart on the stake 10 and one or more cages 50 connected to the mounting brackets 30.

The stake 10 includes an elongated rod 11, preferably round but of any cross-section, of metal, plastic or any other suitable material sufficiently rigid to support the weight of the plant. When used to support tomato plants, the rod 11 will be approximately as long as six feet and approximately one-quarter to one-half inch in diameter. Preferably, the upper end of the rod 11 terminates in a larger cap 13, perhaps shaped like a ball or disk, for reasons hereinafter explained. An anchor, preferably formed from a section of angle iron or a pair of plates 15 and 17, is welded to the lower portion of the stake 10. The lower edges of the angle iron or plates 15 and 17 are cut at an angle 19 so as to provide a taper for ease in penetrating the earth.

Figure 2:
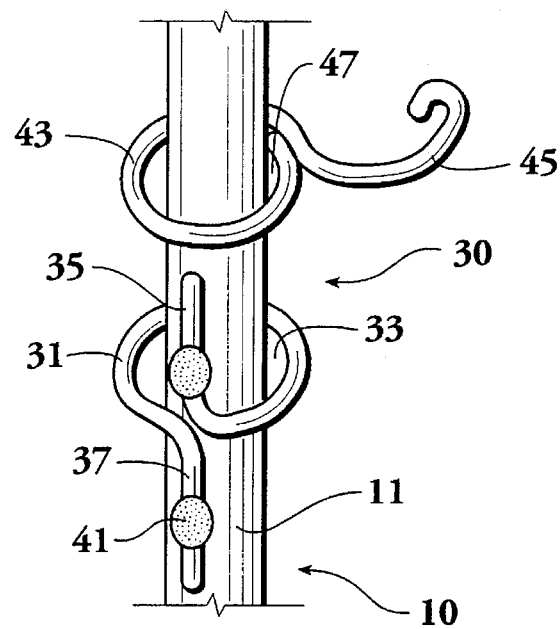
FIG. 2 is an enlarged perspective view of a preferred embodiment of a mounting bracket on the stake of the plant support of FIG. 1.

Looking at FIGS. 1 and 2, the mounting brackets 30 spaced apart on the stake 10 preferably include a wire loop 31 of diameter slightly greater than the diameter of the stake 10 and secured to one side of the stake 10 with a space 33 between the opposite side of the stake 10 and the inner surface of the loop 31. As shown, the ring 31 is a horizontal loop of wire having integral vertical segments 35 and 37 extending upwardly and downwardly at approximately the overlap point of the loop 31. These vertical portions 35 and 37 are fastened to the rod 11 by welds 39 and 41. The shape of the loop 31 is not necessarily circular but is variable so long as it accommodates the rod 11 and provides the desired space 33 as will be hereinafter described. The mounting bracket 30 further includes a second loop of wire 43, preferably of inner diameter greater than the outer diameter of the rod 11 but less than the outer diameter of the fixed loop 31 and the cap 13. Thus, the second loop 43 is free to slide up and down on the rod 11 but cannot pass over a fixed loop 31 or the cap 13. The shape of the sliding loop 43 is also variable, so long as it also accommodates the rod 11 and provides a desired space 47 between the outer surface of the rod 11 and the inner surface of the ring 43, as is also hereinafter described. To facilitate manipulation of the sliding loop 43, it may be integrally extended to a grip or handle portion 45 as is shown in FIG. 2. Looking back at FIG. 1, it will be seen that plurality of fixed mounting loops 31 can be secured to the rod 11 at selected spaced intervals and sliding mounting loops 43 inserted on the stake 10 above each of the fixed mounting loops 31. The fixed loops 31 or the cap 13 fixed to the top of the rod 11 prevent the sliding loops 43 from inadvertent removal from the stake 10.

Figure 3:
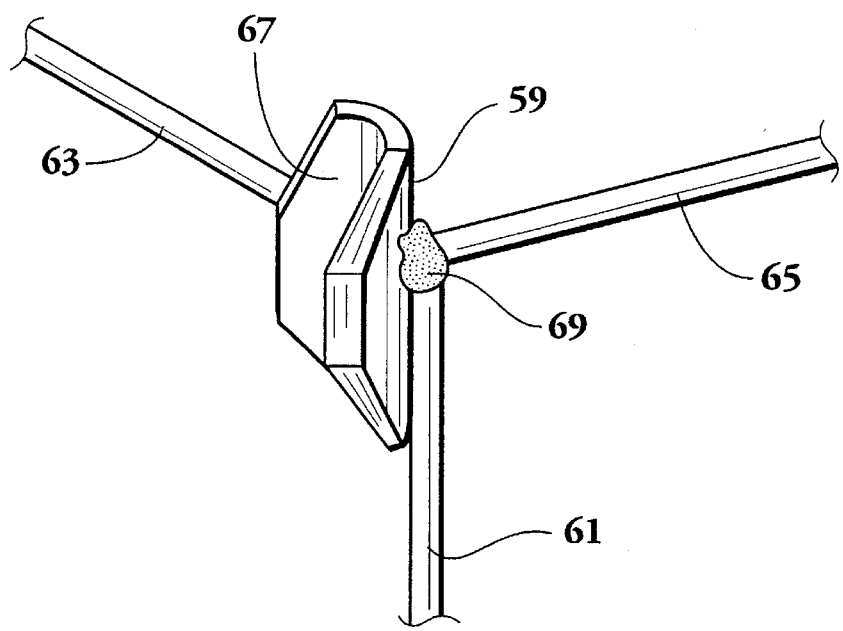
FIG. 3 is an enlarged perspective view of a preferred embodiment of a mounting bracket on the ring assembly of the plant support of FIG. 1.
Figure 7:
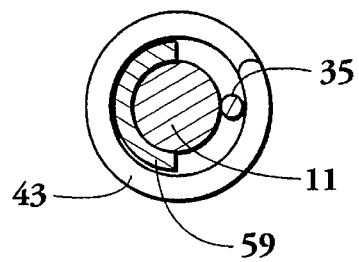
FIG. 7 is a cross sectional view taken along the line 7—7 of FIG. 4.
Figure 6:
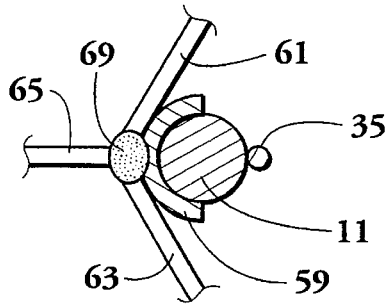
FIG. 6 is a cross sectional view taken along the line 6—6 of FIG. 4.
Figure 5:
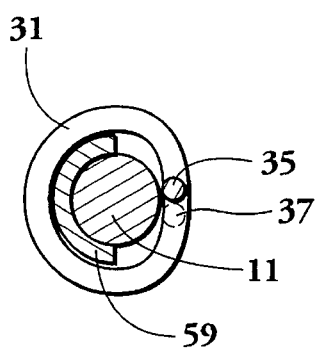
FIG. 5 is a cross sectional view taken along the line 5—5 of FIG. 4.
Figure 4:
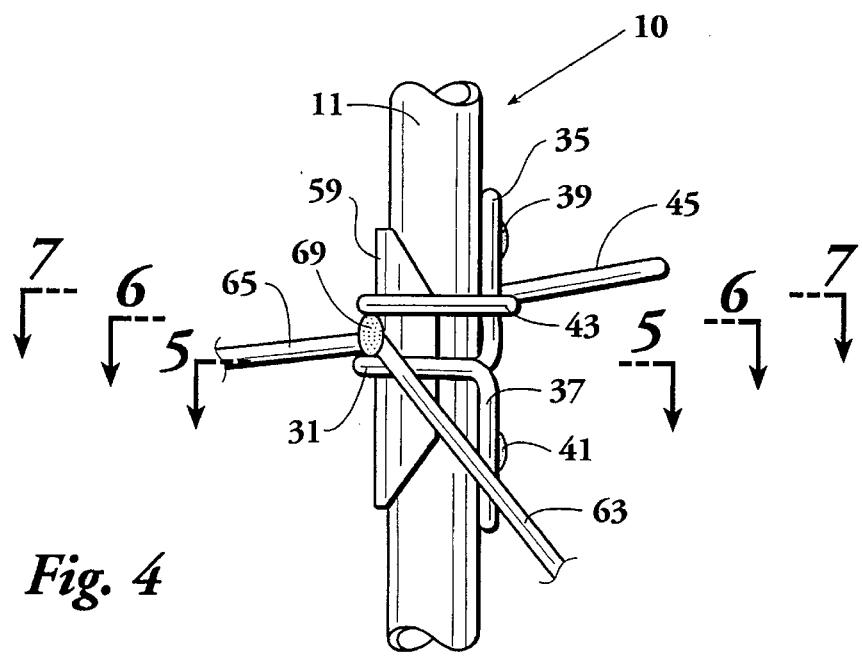
FIG. 4 is an enlarged side elevation view of the ring assembly mounting bracket of FIG. 3 connected to the stake mounting bracket of FIG. 2.

Each plant support assembly preferably consists of a cage (50) of at least two and preferably three substantially circular loops of wire 51, 53 and 55 substantially concentrically connected in horizontal spaced apart relationship by vertical rods 57 and by a bracket 59 connected to the cage by one or more radial arms 61. As shown, three arms 61, 63 and 65 are used, preferably at 120 degree intervals. Furthermore, it is preferred that each sequentially higher loop of the cage is of greater diameter than its predecessor so as to provide an inverted conical cage for the plant. The cage bracket 59 is illustrated in greater detail in FIG. 3. For use with the circular stake 10 of FIG. 1, the bracket 59 consists of a semi-circular segment of tubing or pipe, preferably cut at the corners to taper to approximately a quarter circular arc at the top and bottom of the tubing or pipe. The inside surface 67 of the bracket 59 is contoured to rest flush against the outer surface of the rod 11. The radial arms 61, 63 and 65 are fastened to the outer surface of the bracket 59 by a weld 69. Of course, the method of connection is variable depending on the material used for the bracket 59 and arms 61, 63 and 65. If the rod 11 is not circular, the bracket 59 will be contoured accordingly.

Turning to FIGS. 4 through 7, the manner of connecting the cage bracket 59 to the rod 11 by use of the stake bracket 30 is shown in greater detail. With the sliding mounting loop 43 held a distance above the fixed mounting loop 31, the lower tapered portion of the bracket 59 is inserted into the space 33 between the fixed loop 31 and the rod 11 until one of the arms 61, 63 or 65 rests against the fixed loop 31. The sliding mounting loop 43 is then lowered so that the upper tapered portion of the bracket 59 fits into the space 47 between the sliding loop 43 and the rod 11. The sliding loop 43 is lowered until it rests on one of the radial arms 61, 63 or 65. This secures the support cage 50 in place on the stake 10.

To use the plant support in the normal gardening environment, the gardener vertically aligns the stake 10 adjacent the stem of the plant. The stake 10 and anchor plates 15 and 17 are then penetrated into the ground to a satisfactory depth to support the stake 10 and the plant. The lowermost support assembly or cage 50 is then connected to the lowermost mounting bracket 30 on the stake 10. As the branches of the plant grow and the branch weight increases, it may become desirable to add additional cages 50.

As can best be seen in FIG. 1, where multiple cages 50 are used, the lowermost loop 51 of each cage 50 is larger than the uppermost loop 55 of the cage 50 beneath it. This further continues the inverted conical cage shape which will best accommodate the plant as it grows to its full height. As can be also best seen in FIG. 1, the uppermost mounting bracket 30 is near the top of the stake 10 so that the uppermost cage 50 extends considerably above the height of the stake 10. Thus, a relatively short stake 10 can be used to accommodate a significantly taller plant.

The invention has been described in relation to the use of steel stakes and wire cages and brackets connected by welds. However, any or all of these components could be made of plastic or other suitable material connected in any manner presently known. Since the cages 50 are conical, they not only accommodate the growth pattern of the plant but also facilitate nesting of a great number of cages 50 and stakes 10 in a small storage space.

Thus, it is apparent that there has been provided, in accordance with the invention, a plant support that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A support for a plant comprising:
   a rod;
   at least two brackets fixed in spaced apart relationship on said rod, an uppermost of said brackets being proximate an upper end of said rod; and
   at least one cage having means thereon cooperable with one of said brackets for connecting said cage to said rod, said cage having a depth from a top thereof to said means greater than a distance from said uppermost bracket to said upper end of said rod whereby said top of said cage is higher than said upper end of said rod.

2. A support according to claim 1, each said bracket comprising a first loop of wire about said rod fixed at one portion to said rod and extending at an opposite portion away from said rod to define a space therebetween and a second loop of wire substantially similar to said first loop slidably disposed on said rod above said first loop.

3. A support for a plant comprising:

a rod;

at least two brackets fixed in spaced apart relationship on said rod, an uppermost of said brackets being proximate an upper end of said rod, each said bracket comprising a first loop of wire about said rod fixed at one portion to said rod and extending at an opposite portion away from said rod to define a space therebetween and a second loop of wire substantially similar to said first loop slidably disposed on said rod above said first loop; and at least one cage having a member thereon cooperable with one of said brackets for connecting said cage to said rod, said cage having a depth from a top thereof to said member greater than a distance from said uppermost bracket to said upper end of said rod and said member being of a cross-section contoured to fit snugly into said space and at least one arm extending from a mid-portion of said member to said cage whereby, when a lower portion of said member is inserted into said space and a portion of said arm rests on said first loop, said second loop may be lowered around said rod and an upper portion of said member until said second loop rests on said portion of said arm.

4. A support for a plant comprising:

a rod of circular cross-section;

a plurality of brackets fixed in spaced apart relationship on said rod, an uppermost of said brackets being proximate an upper end of said rod; and at least one cage having a plurality of substantially horizontal loops fixed in spaced-apart relationship by a plurality of substantially vertical legs and means thereon cooperable with one of said brackets for connecting said cage to said rod, said cage having a depth from a top loop thereof to said means greater than a distance from said uppermost bracket to said upper end of said rod.

5. A support according to claim 4, each said bracket comprising a first loop of wire about said rod fixed at one portion to said rod and extending at an opposite portion away from said rod to define a space therebetween and a second loop of wire substantially similar to said first loop slidably disposed on said rod above said first loop.

6. A support according to claim 5, said connecting means comprising a member of cross-section contoured to fit snugly into said space and at least one arm extending from a mid-portion of said member to a not-uppermost loop of said cage whereby, when a lower portion of said member is inserted into said space and a portion of said arm rests on said first loop, said second loop may be lowered around said rod and an upper portion of said member until said second loop rests on said portion of said arm.

7. A support according to claim 4, said rod having an anchor at a lower end thereof, said anchor being tapered for easy penetration into the earth.

8. A support according to claim 5, said rod having a cap at an upper end thereof of perimeter large enough to prevent passage of said second loop thereover.

9. A support according to claim 4, said loops of said cage being substantially circular.

10. A support according to claim 9, each sequentially higher loop of said cage having a diameter greater than an immediately preceding loop of said cage.

11. A support according to claim 10, a lowermost loop of each said cage having a diameter greater than an uppermost loop of an immediately preceding cage.

12. A support according to claim 4, each said cage being substantially concentrically disposed about said rod.

13. A support according to claim 6, said connecting means comprising a semicircular segment of a tube tapered from a mid-portion thereof to approximately quarter circular upper and lower ends and a plurality of arms extending substantially radially from an outer wall of said mid-portion to said not-uppermost loop of said cage.

14. A support according to claim 5, said second loop having an integral handle extending approximately radially therefrom.

15. A support according to claim 5, said first loop having integral legs extending upwardly and downwardly at ends thereof, said legs being fixed to said rod.

* * * * *